United States Patent [19]

Gruett

[11] Patent Number: 5,638,920

[45] Date of Patent: Jun. 17, 1997

[54] AIR TOOL LUBRICATOR

[75] Inventor: Donald G. Gruett, Manitowoc, Wis.

[73] Assignee: Oil-Rite Corporation, Manitowoc, Wis.

[21] Appl. No.: 514,967

[22] Filed: Aug. 14, 1995

[51] Int. Cl.$^6$ ................................................ F16N 27/00
[52] U.S. Cl. .................. 184/7.4; 184/39.1; 184/42; 184/55.2; 210/DIG. 8
[58] Field of Search ....................... 184/39, 39.1, 42, 184/55.2, 7.4; 210/37, DIG. 8

[56] References Cited

U.S. PATENT DOCUMENTS

| | | |
|---|---|---|
| 823,609 | 6/1906 | Manzel . |
| 828,326 | 8/1906 | Manzel . |
| 1,186,485 | 6/1916 | McClelland . |
| 1,186,486 | 6/1916 | McClelland . |
| 1,228,336 | 5/1917 | McClelland . |
| 1,414,610 | 5/1922 | Wood . |
| 1,550,972 | 8/1925 | Laudan . |
| 1,587,609 | 6/1926 | Simpson . |
| 1,617,736 | 2/1927 | Arnold . |
| 1,632,807 | 6/1927 | Sweet . |
| 1,764,823 | 6/1930 | Bowlus . |
| 1,903,554 | 4/1933 | Pritchard . |
| 1,965,038 | 7/1934 | Hartman . |
| 1,996,912 | 4/1935 | Erickson et al. . |
| 2,041,023 | 5/1936 | Roberts . |
| 2,070,574 | 2/1937 | Bijur . |
| 2,164,273 | 6/1939 | Hodson . |
| 2,278,452 | 4/1942 | Kocher . |
| 2,331,984 | 10/1943 | Kocher . |
| 2,343,302 | 3/1944 | Kocher . |
| 2,758,575 | 8/1956 | Wampach . |

(List continued on next page.)

FOREIGN PATENT DOCUMENTS

| | | |
|---|---|---|
| 487196 | 10/1952 | Canada . |
| 1400280 | 7/1964 | France . |
| 719218 | 4/1942 | Germany . |
| 61-65999 | 4/1986 | Japan . |
| 110904 | 4/1944 | Sweden . |
| 372436 | 10/1963 | Switzerland . |
| 1467304 | 3/1989 | U.S.S.R. . |
| 615710 | 1/1949 | United Kingdom . |

OTHER PUBLICATIONS

Serv-Oil® Point-to-Point Oil Delivery System for Air Tools, Brochure from Master Pneumatic Detroit, Inc., Publication No. : Lub Hose 888. Not Dated.

Serv-Oil® Single Point Lubricator (SPL) for Air Tools, Brochure from Master Pneumatic Detroit, Inc., Publication No.: SPL10M588. Dated Dec. 1981.

Serv-Oil® Pneumatic Injection Lubrication, Brochure from Master Pneumatic Detroit, Inc. Publication No.: 7.5M988 Feb. 1989.

Injection Lubricators, Brochure from WATTS FluidAire Kittery, Maine, Publication No.: 8999150. Not Dated.

Single Point Lubricators, Brochure from C.A. Norgren Company, Littleton, Colorado, Brochure No.: NC-30,20. Not Dated.

*Primary Examiner*—Thomas E. Denion
*Attorney, Agent, or Firm*—Godfrey & Kahn, S.C.

[57] ABSTRACT

An air tool lubricator which includes a body having an inlet and an outlet for a gas, a top bore, and a lubricant chamber. The first end of a lubricant conduit is coupled in fluid-flowing relation to the lubricant chamber, and the second end of the lubricant conduit is disposed in the outlet of the body and is capable of being coupled to a lubricant line. The lubricant line carries lubricant from the air tool lubricator to an air tool. Located within the lubricant chamber and capable of delivering a predetermined amount of lubricant into the lubricant conduit is a lubricant metering device or injector. Mounted on the body is a reservoir which is capable of holding a liquid lubricant, and which has a priming conduit through which lubricant may be delivered to the bore of the body. A priming pump is mounted on the reservoir and is capable of delivering a predetermined amount of lubricant from the reservoir to the lubricant chamber. The priming pump is used to fill the lubricant line with lubricant. The air tool lubricator is designed to be calibrated to account for manufacturing tolerances.

15 Claims, 5 Drawing Sheets

U.S. PATENT DOCUMENTS

| | | |
|---|---|---|
| 3,079,867 | 3/1963 | Thomas . |
| 3,131,786 | 5/1964 | Gleason et al. . |
| 3,156,320 | 11/1964 | Bystricky et al. . |
| 3,182,750 | 5/1965 | Gleason et al. . |
| 3,206,175 | 9/1965 | Boteler .................................. 184/55.2 |
| 3,362,618 | 1/1968 | Fortinov . |
| 3,386,383 | 6/1968 | Dreher . |
| 3,500,960 | 3/1970 | Jaggi . |
| 3,595,341 | 7/1971 | Oglesbee . |
| 3,599,753 | 8/1971 | Walsh . |
| 3,731,763 | 5/1973 | Thrasher, Jr. et al. ................ 184/55.2 |
| 3,759,424 | 9/1973 | Maddock . |
| 3,841,438 | 10/1974 | Tine et al. . |
| 3,870,125 | 3/1975 | Gorski . |
| 3,955,647 | 5/1976 | Tine et al. .............................. 184/39.1 |
| 3,982,609 | 9/1976 | Bouplon . |
| 4,042,311 | 8/1977 | Yonezawa . |
| 4,094,383 | 6/1978 | Thrasher, Jr. . |
| 4,095,674 | 6/1978 | Kido et al. . |
| 4,125,176 | 11/1978 | Thrasher ................................ 184/39.1 |
| 4,174,767 | 11/1979 | Kramer . |
| 4,261,688 | 4/1981 | Thomas et al. . |
| 4,291,785 | 9/1981 | Matysak . |
| 4,345,668 | 8/1982 | Gaunt . |
| 4,450,938 | 5/1984 | Davenport et al. . |
| 4,784,584 | 11/1988 | Gruett . |
| 4,807,721 | 2/1989 | Fujiwara . |
| 4,858,645 | 8/1989 | Reeves . |
| 4,944,367 | 7/1990 | Nelson et al. . |
| 4,955,953 | 9/1990 | Kayser . |
| 5,002,156 | 3/1991 | Gaunt . |

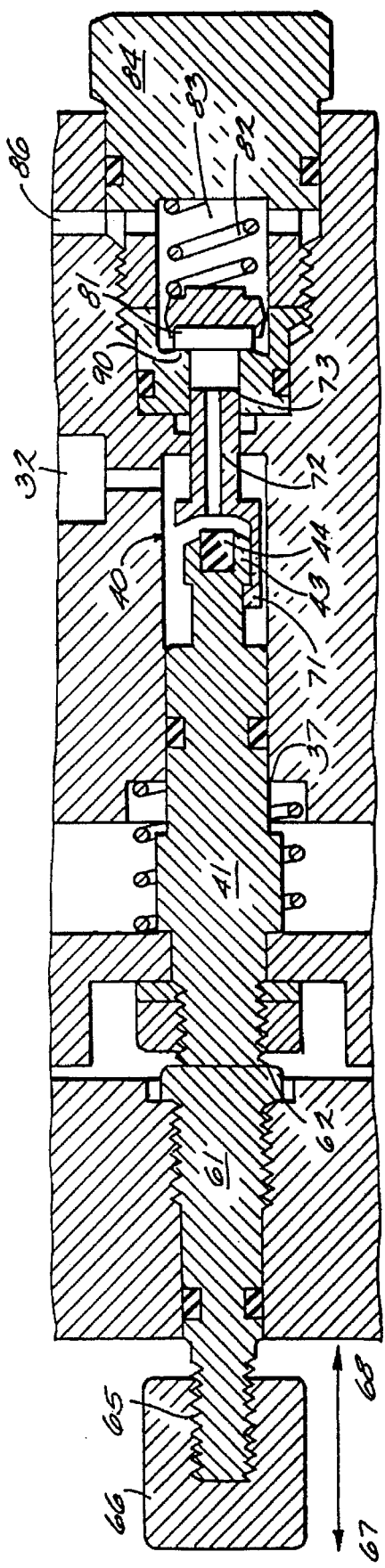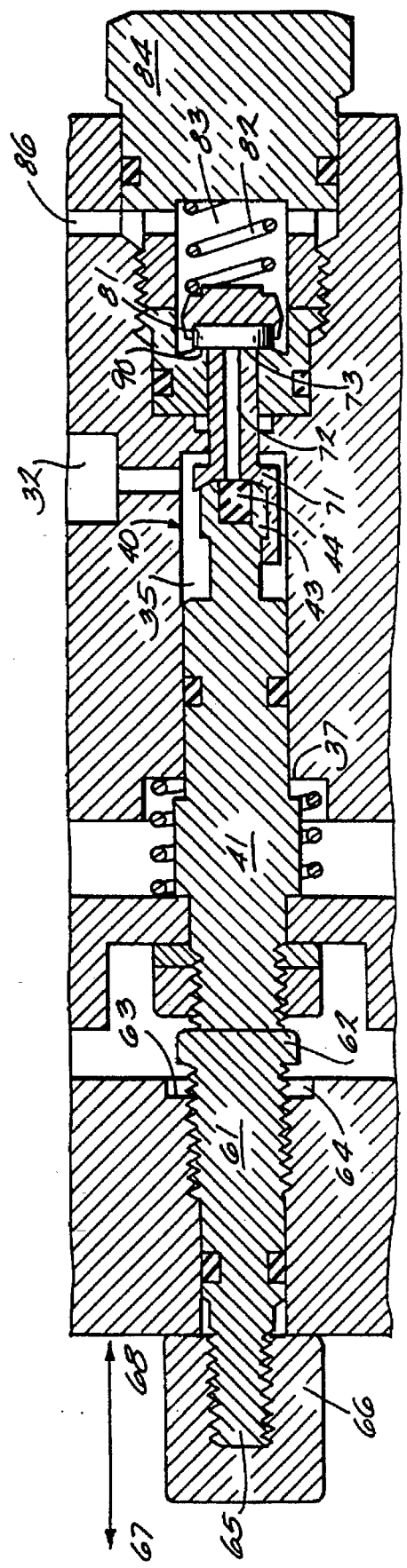

AIR TOOL LUBRICATOR

BACKGROUND OF THE INVENTION

1. Field of the Invention

The present invention relates to devices capable of precisely metering a liquid. More particularly, the present invention relates to devices which deliver a precise volume of lubricant to an air tool each time the tool is cycled.

2. Description of the Prior Art

Air tool lubricators are used to deliver precise amounts of lubricant, typically oil, to air tools. They are coupled to the air line upstream of the air tool and sense airflow when the tool is cycled. Having sensed the airflow, the lubricator injects a precise volume of lubricant into the airline. For example, U.S. Pat. No. 4,450,938, issued to Davenport et al., discloses a lubricator having a single ball check design. The Davenport lubricator deposits oil directly into the air stream of the airline, and the air stream carries the lubricant to the air tool.

In other lubricators, lubricant is carried to the air tool through tubing such as ⅛" O.D. nylon. This tubing is pre-filled with lubricant and is placed within the air line supplying the air tool. Such devices are available from Master Pneumatic-Detroit, Inc., under the trade designation Servo-Meters. In these devices, air pressure on a piston pushes a metering pin into a bored hole a preset distance. This action forces lubricant through a check valve and into a lubricant line (nylon tubing). A ball check is used at the air tool so that the lubricant line remains filled with lubricant.

While the above-mentioned, prior-art devices are functional, they are not completely satisfactory. In particular, presently available devices are unsatisfactory because they still may deliver either too little or too much lubricant to an air tool. In addition, many devices of present design are undesirable because they require the use of a pre-filled lubricant line. In devices using lubricant lines, lines are pre-filled so that each metering of lubricant into the line forces an equal amount of lubricant out of the line at the other end. Lubricant lines must be carefully filled in order to avoid introducing air bubbles into them. In addition, lubricant lines may leak when not in use. For example, leaking may occur when lines are shipped from the factory to the end user. In addition, when maintenance on air tool systems is performed, the lubricant line must be disassembled and then re-filled before the device may be put back into operation.

In addition to suffering from problems associated with pre-filled lubricant lines, prior-art lubricators have at least one additional shortcoming. In general, prior-art lubricators cannot be accurately and effectively calibrated so as to adjust the metering of each lubricator in order to compensate for manufacturing variances. As is known in the art, the various components and parts of lubricators cannot be machined and assembled perfectly, but they may be constructed within certain tolerances. The variances caused by machining tolerances significantly effect lubricator operation, particularly when very precise amounts of lubricant must be metered.

Thus, it would be desirable to have an air tool lubricator that may be more effectively calibrated than prior-art devices and, therefore, deliver a more precise amount of lubricant to an air tool than prior-art devices. Further, it would also be desirable to have an air tool lubricator that does not require a pre-filled lubricant line.

OBJECTS AND SUMMARY OF THE INVENTION

Therefore, it is an object of the present invention to provide an improved air tool lubricator which delivers a more precise amount of lubricant to air tools than prior-art devices.

A further object of the present invention is to provide an air tool lubricator which does not require a pre-filled lubricant line.

A further object of the present invention is to provide a unique structure and method of filling, or priming, a lubricant line used with air tool lubricators.

These and other objects and advantages are achieved in an air tool lubricator of the present invention which includes a body having an inlet and an outlet for a gas, and a top bore. Mounted on the body is a reservoir which is capable of holding a liquid lubricant and which has a priming conduit through which lubricant may be delivered to the bore of the body.

Positioned within the body is a lubricant chamber. The body of the air tool lubricator also includes a lubricant conduit which has first and second ends. The first end of the lubricant conduit is coupled in fluid flowing relation to the lubricant chamber, and the second end is disposed in the outlet of the body. A priming pump or mechanism is mounted on the reservoir. The priming mechanism is capable of delivering a predetermined amount of lubricant from the reservoir to the lubricant chamber. Located within the lubricant chamber and capable of delivering a predetermined amount of lubricant into the lubricant conduit is a lubricant metering device or injector.

Further objects and advantages of the present invention will become more apparent from the following detailed description of the preferred embodiment taken in combination with the accompanying drawings.

BRIEF DESCRIPTION OF THE DRAWINGS

FIG. 6 is an enlarged, cross-sectional view as in FIGS. 2 and 3 and showing the operation of the adjustment stem employed in the present invention in a first position.

FIG. 7 is an enlarged, cross-sectional view as in FIGS. 2 and 3 and showing the operation of the adjustment stem employed in the present invention in a second position.

DESCRIPTION OF THE PREFERRED EMBODIMENT

Figure 1:
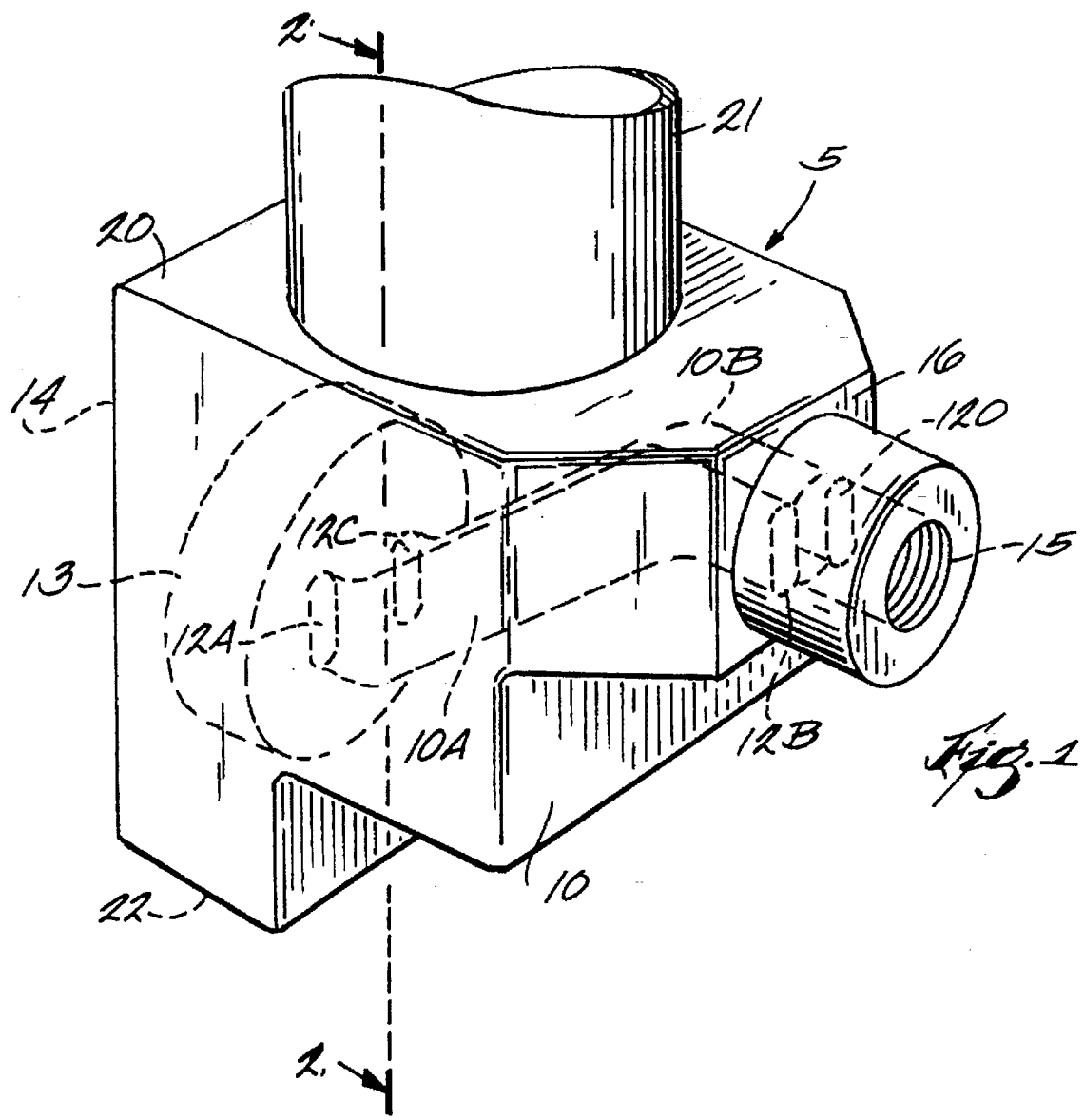
FIG. 1 is partial, rear, perspective view of an air tool lubricator constructed according to one embodiment of the present invention.
Figure 2:
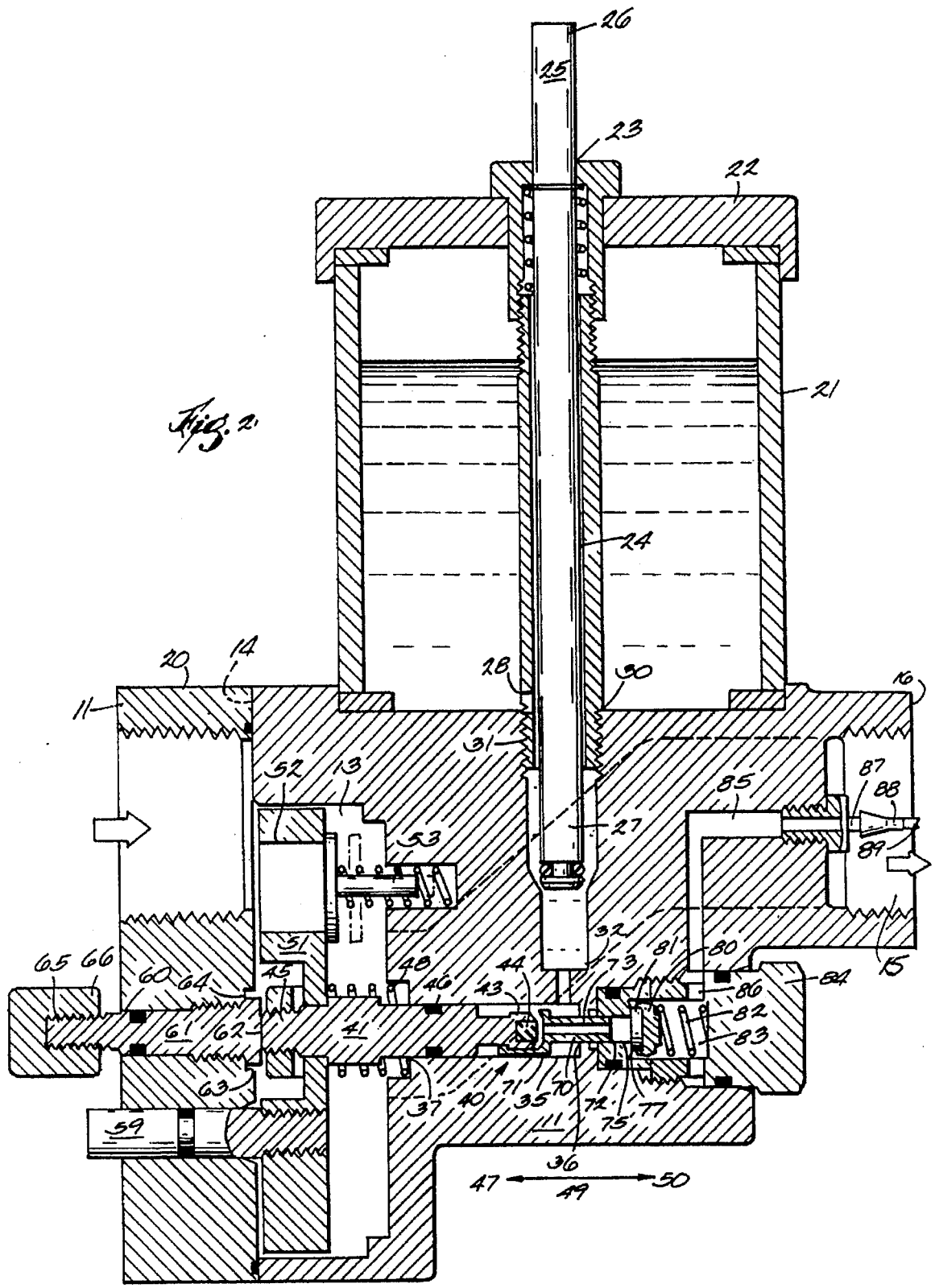
FIG. 2 is a cross-sectional view of the air tool lubricator of FIG. 1 taken along the line 2—2 of that figure.

Referring more particularly to the drawings, an air tool lubricator 5 is shown in perspective in FIG. 1. The air tool lubricator 5 is designed to be disposed in an air supply line. The air tool lubricator 5 includes a body 10, and a cover 11 (FIG. 2). The embodiment shown in FIG. 1 includes two bores 10A and 10B formed in the body 10, each having openings 12A, B, C, and D in opposed ends. A gas or air inlet 13 is positioned in a first surface 14 of the body 10, and a gas or air outlet 15 is positioned on a second surface 16 of the body 10, each in fluid communication with the bores 10A and 10B. The body 10 includes a top surface 20, and mounted on the top surface 20 is a reservoir 21 which is capable of holding a liquid, such as lubricant.

As can be seen by reference to FIG. 2, the reservoir 21 has a top 22 with an opening 23 which leads to a centrally positioned cylinder or priming conduit 24. A spring-biased priming mechanism 25, having a first portion 26 and a second portion 27, is mounted within the cylinder 24. An opening 28 permits lubricant in the reservoir 21 to flow into the body 11 through a bore 30 in the top surface 20. The bore has a top portion 31, a narrower second portion 32, and is coupled in fluid flowing relation to a lubricant chamber 35. The lubricant chamber 35 has a first end 36 and a second end 37. In one embodiment of the present invention, about 0.024 inches$^3$ of lubricant is displaced each time the priming mechanism is pumped. However, the sizing of the priming mechanism and, therefore, the volume of lubricant displaced may vary according to the application at hand.

Positioned in the lubricant chamber 35 is a horizontally positioned, slidable injector 40. The injector includes an air piston 41 and a liquid piston, discussed further hereinafter. The air piston has a T-shaped end or head 43, a poppet valve 44 and a second end 45. An O-ring 46 mounted on the air piston 41 seals the second end 37 of the lubricant chamber 35. The injector 40 is biased in a first forward position 47 by a spring 48 and is movable to a second position 49 and a third position 50. The air piston of the injector 40 is coupled to a inlet piston 51.

The inlet piston 51 is positioned within the air inlet 13. The inlet piston 51 has two openings 52, though only one is shown in the drawings. Each of the openings is occluded by a spring valve 53 (only one is shown). Connected to the inlet piston 51 is a motion indicator 59. Positioned in a bore 60 in the cover 11 is an adjustment stem 61 having a first end 62, which is capable of sitting in a depression 63 having a surface 64, and a second end 65, which has a knob 66. The first end 62 contacts the inlet piston 51. The adjustment stem is movable from a first position 67 to a second position 68. (FIGS. 6 and 7.) The function of the adjustment stem 61 is discussed below.

Figure 3:
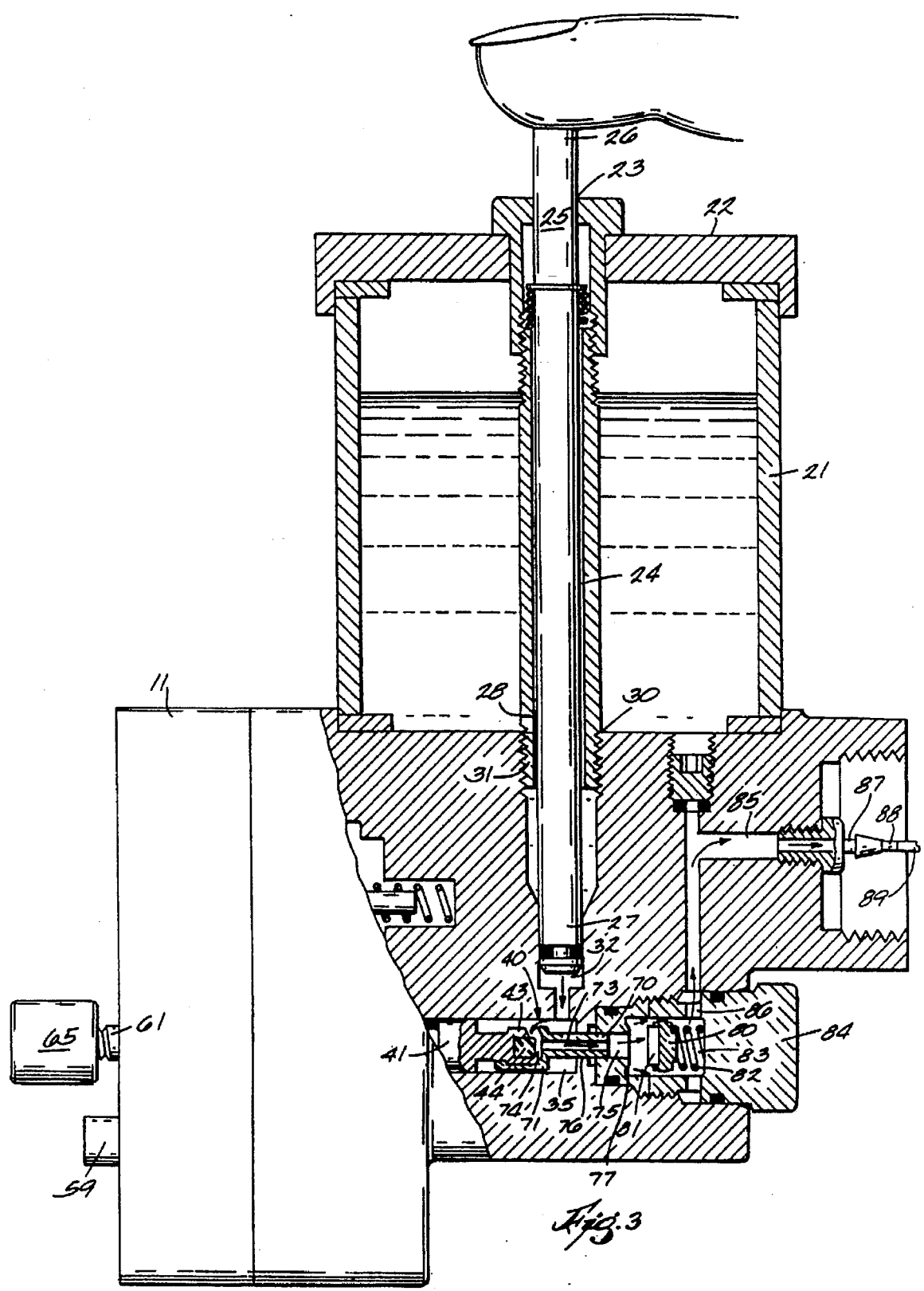
FIG. 3 is a view of the air tool lubricator of FIG. 1 shown partially in section, and showing the action of the priming mechanism employed in the present invention.
Figure 4:
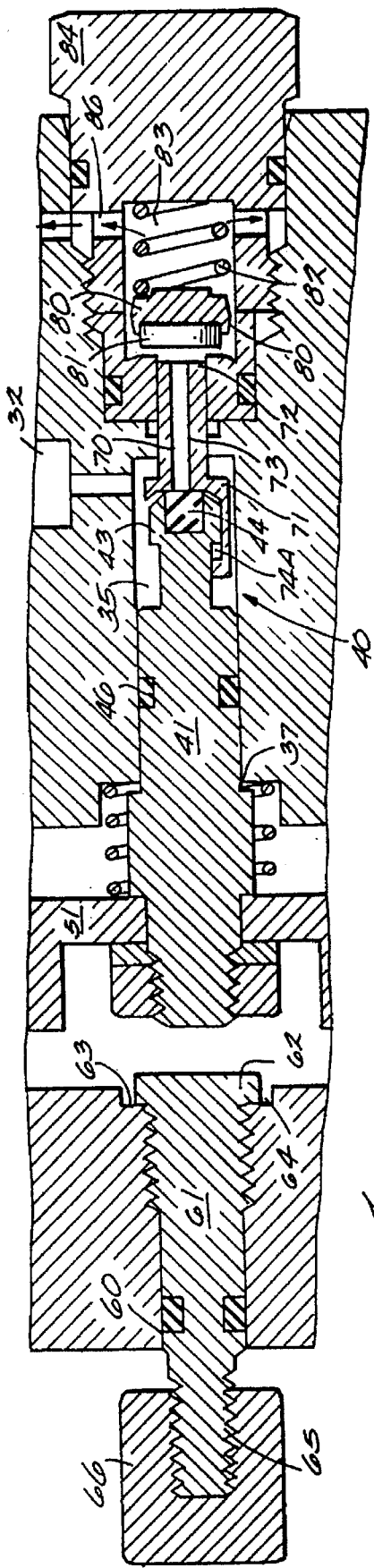
FIG. 4 is an enlarged, cross-sectional view as in FIGS. 2 and 3 showing the operation of the metering device employed in the present invention.
Figure 5:
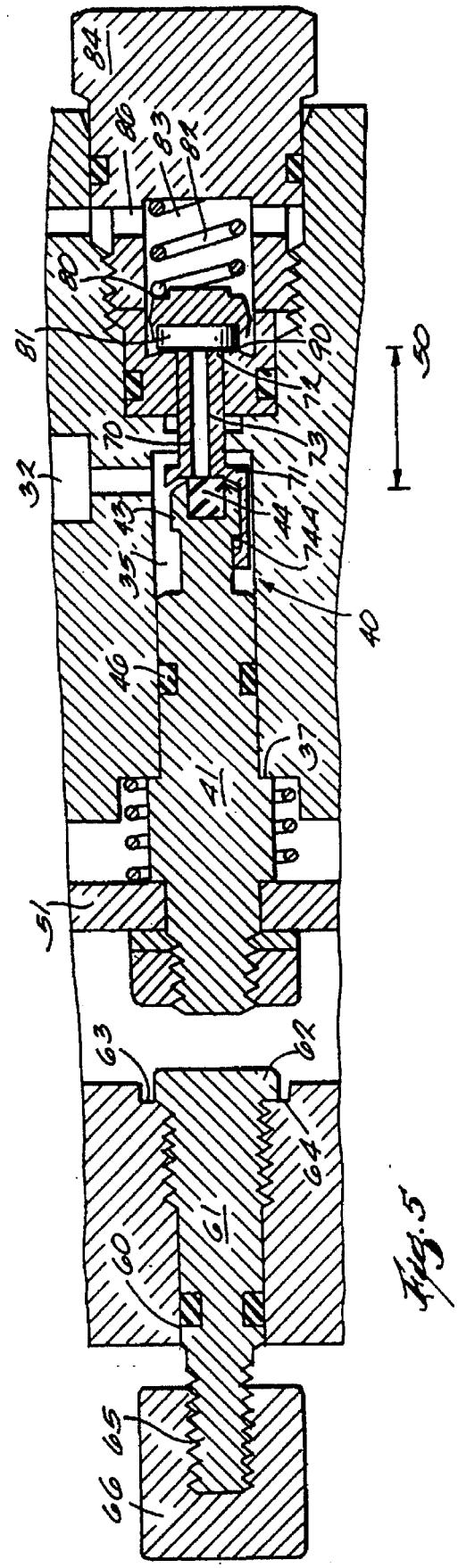
FIG. 5 is another enlarged, cross-sectional view as in FIGS. 2 and 3 showing the operation of the metering device employed in the present invention.

Matingly engaged to the T-shaped head 43 of the air piston 41 is a liquid piston 70. The liquid piston 70 includes and L-shaped portion 71 at one end, an opposite end 72, and a bore 73 leading from one end to the other. As best seen by reference to FIG. 3, there is a lost motion gap 74 between the air piston 41 and the liquid piston 70. When the air piston 41 is in a forward position, a gap 74A forms behind the T-shaped head 43 of the liquid piston 41, between the T-shaped head and the L-shaped portion 71 of the liquid piston 70. (FIGS. 4 and 5).

Adjacent to the first end 36 of the lubricant chamber 35 is a pressure chamber 75 having a first end 76 and a second end 77. (FIG. 3). Sealing the second end 77 of the pressure chamber 75 is an evacuation valve 80. The evacuation valve 80 has a valve head 81 and a valve spring 82 biasing the valve 80 to the closed position. The valve 80 is positioned in an evacuation chamber 83. The evacuation chamber 83 is closed off by a plug or nut 84.

Coupled to the evacuation chamber 83 is lubricant conduit 85, which has a first end 86. The first end 86 is coupled in fluid flowing relation, through the evacuation chamber, to the lubricant chamber 35. The lubricant conduit 85 has a second end 87. Mounted on the second end 87 is a fitting or coupler 88 which is capable of being coupled to lubricant tubing or a lubricant line 89.

OPERATION

When properly disposed between a source of compressed air and an air tool, the air tool lubricator 5 of the present invention delivers a precise amount of lubricant to the air tool.

Before the air tool lubricator 5 is operated, the lubricant line 89 and the lubricant chamber 35 are filled with lubricant. The lubricant chamber 35 may be filled with lubricant from the reservoir 21. Lubricant flows from the reservoir by gravity and the suction force of the horizontally positioned, slidable injector 40, through the bore 30 to the lubricant chamber 35, which is located in the body of the air tool lubricator. In order to fill the lubricant line 89, the priming mechanism is activated. It may be activated manually, for example, by an operator's index finger. The priming mechanism 25 moves from the first portion 31 of the bore 30 to the second portion 32, thereby forcing liquid lubricant through the poppet valve 44, and into the bore 72 as shown by the arrows in FIG. 2. The flow pressure of the lubricant forces the evacuation valve 80 open and lubricant flows into the evacuation chamber 81 up the lubricant conduit 85 to the lubricant line 89. The provision of a priming mechanism permits air tools to be coupled to supply lines which are not pre-filled. As with typical lubricant lines, 5 to 10 seconds of priming is sufficient to fill the lubricant line 89.

Air flow through the lubricator 5 is turned on and off by activation of the air tool. When the air tool is activated, air flows into the air tool lubricator 5 and is directed to the inlet piston 51. The air flow causes the air pressure on the right hand side (as viewed in FIG. 2) of the inlet piston 51 to drop. The pressure differential causes the inlet piston 51 to move a predetermined amount forward. Typically, the pressure differential is about 5 psi. Simultaneously, the air flow is directed to the spring valves 53 which are biased to occlude the openings 52. The spring valves close off the chambers of the air tool lubricator from the flowing air. Thus, the air has no space to flow into. A force acts on the spring valves which eventually overcomes the biasing force of their springs, opening the valves and, thereby, allowing air to flow into the body of the air tool lubricator.

As the inlet piston 51 moves forward, the injector 40 moves a predetermined amount forward from the first forward position 47 to the third position 50, injecting a predetermined amount of lubricant into the first end of the lubricant conduit 89 (FIG. 4).

The injector 40 is designed so as to ensure that no air bubbles are introduced into the lubricant line 89. Its design is based upon one of the inventor's earlier lubricators which is disclosed in U.S. Pat. No. 4,784,584, which is hereby incorporated by reference herein. As the air piston 41 of the injector 40 moves forward, in response to the movement of the inlet piston 51, the poppet valve 44 closes, pressurizing the pressure chamber 75. Pressure in the pressure chamber increases, thereby forcing the evacuation valve 80 to open. When the evacuation valve opens a measured volume of liquid flows out of the pressure chamber 75. The injector 40 continues to move forward to the third position 50 (FIG. 5) and pushes the liquid piston 70 out of the pressure chamber 75 a distance called the kickoff amount, ejecting all of the lubricant located forward of the liquid piston out of the pressure chamber. Typically, the kickoff amount is about 0.005 of an inch.

At the third position 50, the liquid piston 70 physically contacts the evacuation valve head 81 creating a differential pressure. This action causes any air bubbles and any impurities in the lubricant to be flushed out of the seal cavity and clearances of the pressure chamber 75. The air bubbles and impurities are carried down stream, through the lubricant conduit 85 and lubricant line 89 during each cycle.

At the end of the cycle, the evacuation valve 80 is closed by the force applied by its biasing spring, air flow to the air tool stops, and the inlet piston 51 moves back to its original position. The air piston 41 moves back to the first forward position 47. As the air piston 41 moves rearward the popper valve 44 opens and liquid is drawn through the lubricant chamber 35 into the pressure chamber 75. When air flows again, the cycle is repeated.

As noted above, the present invention is designed so as to facilitate its calibration to a zero reference so that precise metering of lubricant may be carried out. As should be understood, the lose fit between the air piston 41 and the liquid piston 70, shown by the gaps 74 and 74A, permits the air piston 41 to move along its axis, without pumping any lubricant. When first assembled, it is possible for the liquid piston 70 to be positioned such that gaps 74 and 74A are both present. The air tool lubricator must be calibrated to account for the "lost motion" of the slidable injector 40 as well as the variable position of the liquid piston 70. In addition, the size of the lost motion gap 74 varies with each air tool lubricator according to manufacturing tolerances. Thus, the calibration mechanism is utilized to adjust for all of these variations.

Before calibration is done, the lost motion gap 74 is measured. It is measured by standard techniques and is best accomplished by measuring the amount of play between the air piston 41 and the liquid piston 70 when the two are put together in an assembly as the injector 40, but before they are mounted within the air tool lubricator. Typically, the lost motion gap will be in a range of about 0.008 to about 0.020 of an inch.

In order to calibrate the air tool lubricator, the knob 66 is removed from the second end 65 of the adjustment stem 61, the nut 84 is unscrewed, and the evacuation valve 82 and spring 83 are removed. A dial indicator having a dial plug is placed within the evacuation chamber 83. The dial indicator is pushed into the evacuation chamber 83 until it meets the surface 90 at the second end 77 of the pressure chamber 75 and a zero reading is taken. The air piston 41 and liquid piston 70, which is coupled to the air piston 41, are pushed forward by turning the adjustment stem 61 toward position 68. The air piston 41 and liquid piston 70 are pushed forward until they meet the dial indicator.

The stem 61 is then turned toward the position 67 so that it no longer contacts the injector 40. The dial plug, which is sized to fit into the pressure chamber 75, is pushed into the pressure chamber 75 to contact the liquid piston 70. The liquid piston 70 and, therefore, the injector 40 are moved back an amount equivalent to the lost motion gap plus the kickoff amount. For purposes of discussion this amount is called the set distance. The stem 61 is then turned toward the position 68 until it contacts the injector 40, but no farther, so that the set distance is maintained. The knob 66 is then screwed on stem 61 until it contacts the cover 11 and it is locked in position by, for example, a set screw. At this point the injector is set to zero calibration or zero stroke. The set screw acts as a stopping mechanism on the adjustment stem so as to prevent the adjustment of the injector to a position where it will have no pumping action. The stem 61 then may be moved toward the position 67 to adjust the stroke of the injector 40 and, thus, the amount of lubricant metered by it. It has been found that the adjustment stem 61 should be constructed so that it can be adjusted about 0.115 inches along its axis.

For most applications, the air tool lubricator will be calibrated to have a zero stroke. However, an additional amount may be added to the set distance so as to adjust the air tool lubricator to have an predetermined minimum stroke, thus making it impossible to completely shut off lubricant flow to an air tool.

After zero stroke or a predetermined minimum stroke has been established, the knob 66 and cover 11 may then be appropriately marked to indicate the amount of stroke of the injector. They may be marked to have a zero stroke or minimum stroke, when the knob 66 is adjacent to the surface 11 and the adjustment stem is the position 68, and a maximum stroke, when the knob 66 is spaced apart from the surface 11 and the adjustment stem is in the position 67.

The unique design described above, and the ability to calibrate the slidable injector provided thereby, permits an air tool lubricator of the present invention to deliver lubricant in individual metered amounts from about 0.00005 inches$^3$ to about 0.0015 inches$^3$. Unlike prior-art devices, the injector 40 incorporates a unique design which allows it to function both in response to air flow and in response to forced lubricant flow. In addition, the air tool lubricator is designed so as to be directly activated by the flow of air to it, as the injector 40 is directly coupled to the inlet piston 51. Thus, the injector 40 may be described as a direct acting injector.

While the present invention has been described in what is believed to be the most preferred form, it is to be understood that the invention is not confined to the particular construction and arrangement of the components herein illustrated and described, but embraces such modified forms thereof as come within the scope of the following claims.

What is claimed is:

1. An air tool lubricator comprising:

a body having an inlet and an outlet for a gas, and a bore, the inlet having a first end with an opening and a second end;

a reservoir for holding a liquid lubricant, connected to the body and having a priming conduit through which lubricant may be delivered to the bore of the body;

a lubricant chamber positioned within the body;

a lubricant conduit having first and second ends, the first end coupled in fluid flowing relation to the lubricant chamber, the second end disposed in the outlet of the body;

an inlet piston aligned substantially parallel to the opening of the inlet; and a lubricant injector for delivering a predetermined amount of lubricant into the lubricant conduit, responsive to both air flow and forced liquid flow, and located within the lubricant chamber, wherein the injector moves in correspondence to the motion of the inlet piston.

2. An air tool lubricator as claimed in claim 1, further comprising:

a priming mechanism for filling a lubricant line and coupled in fluid flowing relation to the reservoir, the lubricant line for delivering lubricant to an air tool.

3. An air tool lubricator as claimed in claim 1, and wherein the injector is axially slidable from a first position, through a second position, to a third position, and includes an air piston and a liquid piston coupled to the air piston.

4. An air tool lubricator as claimed in claim 1, and wherein the body includes a cover mounted on the body, adjacent to the inlet.

5. An air tool lubricator as claimed in claim 1, and wherein the lubricant conduit includes a coupler for receiving tubing through which a liquid may flow.

6. An air tool lubricator as claimed in claim 1, the device further comprising an adjustment stem mounted on the body and capable of moving the liquid injector along the liquid injector's axis.

7. A device for metering a liquid, the device comprising:

a body having an inlet and an outlet for a gas, and a bore, the inlet having a first end with an opening and a second end;

a reservoir for holding a liquid lubricant, connected in fluid flowing relation to the body, and having a priming conduit through which lubricant may be delivered to the bore of the body;

a lubricant chamber positioned within the body;

a lubricant conduit having first and second ends, the first end coupled in fluid flowing relation to the lubricant chamber, the second end disposed in the outlet of the body;

an inlet piston aligned substantially parallel to the opening of the inlet;

a priming mechanism for filling a lubricant line and coupled in fluid flowing relation to the reservoir, the lubricant line for delivering lubricant to an air tool; and a lubricant injector responsive to both air flow and forced liquid flow, located within the lubricant chamber, and for delivering a predetermined amount of lubricant into the lubricant conduit, wherein the injector moves in correspondence to the motion of the inlet piston.

8. A device as claimed in claim 7, and wherein the injector is axially slidable along a horizontal plane from a first position, through a second position, to a third position, and includes an air piston and a liquid piston coupled to the air piston.

9. A device as claimed in claim 7, and wherein the body includes a cover mounted on the body, adjacent to the inlet.

10. A device as claimed in claim 7, and wherein the lubricant conduit includes a coupler for receiving tubing through which a liquid may flow.

11. A device as claimed in claim 7, the device further comprising an adjustment stem mounted on the body and capable of moving the liquid injector along the liquid injector's axis.

12. A device for metering a liquid, the device comprising:

a body having an inlet and an outlet for a gas, a bore, and a cover mounted on the body adjacent to the inlet, the inlet having a first end with an opening and a second end;

a reservoir for holding a liquid lubricant mounted on the body, and having a priming conduit through which lubricant may be delivered to the bore of the body;

a lubricant chamber positioned within the body;

a lubricant conduit having first and second ends, the first end coupled in fluid flowing relation to the lubricant chamber, the second end disposed in the outlet of the body and having a coupler mounted thereon;

a priming mechanism for filling a lubricant line and positioned within the reservoir, the lubricant line for delivering lubricant to an air tool;

a horizontally positioned, slidable lubricant injector responsive to both air flow and forced liquid flow, located within the lubricant chamber, including an air piston and a liquid piston coupled to the air piston, and for delivering a predetermined amount of lubricant into the lubricant conduit;

an inlet piston responsive to the flow of compressed air, located within the inlet, substantially parallel to the opening of the inlet, and coupled to the air piston of the injector, whereby the injector moves in correspondence to the motion of the inlet piston.

13. A device as claimed in claim 12, the device further comprising an adjustment stem mounted on the body and capable of moving the liquid injector along the liquid injector's axis.

14. A device as claimed in claim 13, the device further comprising:

an evacuation chamber positioned in fluid flowing relation between the lubricant chamber and the lubricant conduit and having a first end and a second end;

a pressure chamber positioned in fluid flowing relation between the evacuation chamber and the lubricant chamber; and a removable nut positioned in sealing relation relative to the second end of the evacuation chamber.

15. A method of calibrating a device for metering a liquid, the device including an adjustment stem and an injector aligned with the adjustment stem, the injector having a pumping motion, movable to a position where the adjustment stem and injector are in contact with one another, and axially moveable in a chamber from a position of minimum stroke to a position of maximum stroke, and having an air piston and a liquid piston movably coupled thereto, the liquid piston movable from a first position, where the air piston and the liquid piston are in contact with one another, to a second position, where the air piston and liquid piston are still coupled to one another, spaced apart from one another, and a gap exists between them, the method comprising the steps of:

measuring the size of the gap between the air piston and the liquid piston;

determining a position where the injector will have no pumping motion;

setting the injector to a position of minimum stroke; and mounting a stopping mechanism on the adjustment stem so as to prevent the adjustment of the injector to the position where it will have no pumping motion.

* * * * *